(12) United States Patent
Nagase et al.

(10) Patent No.: US 12,055,749 B2
(45) Date of Patent: Aug. 6, 2024

(54) KEYBOARD UNIT AND ELECTRONIC APPARATUS INCLUDING COUPLER AND SUPPORT MEMBER

(71) Applicant: LENOVO (SINGAPORE) PTE. LTD., Singapore (SG)

(72) Inventors: Kentaro Nagase, Yokohama (JP); Satoshi Douzono, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 18/184,372

(22) Filed: Mar. 15, 2023

(65) Prior Publication Data
US 2023/0341611 A1  Oct. 26, 2023

(30) Foreign Application Priority Data
Apr. 25, 2022 (JP) ................... 2022-071708

(51) Int. Cl.
| | |
|---|---|
| F21V 8/00 | (2006.01) |
| G06F 1/16 | (2006.01) |
| G06F 3/02 | (2006.01) |
| H01H 13/02 | (2006.01) |
| H01H 13/70 | (2006.01) |

(52) U.S. Cl.
CPC ......... *G02B 6/0055* (2013.01); *G02B 6/0088* (2013.01); *G06F 1/1616* (2013.01); *G06F 3/02* (2013.01); *H01H 13/023* (2013.01); *H01H 13/70* (2013.01)

(58) Field of Classification Search
CPC ... G02B 6/0055; G02B 6/0088; G06F 1/1616; G06F 3/02; H01H 13/023; H01H 13/70
See application file for complete search history.

(56) References Cited

U.S. PATENT DOCUMENTS

2018/0301299 A1* 10/2018 Lin .................. H01H 13/70
2020/0335290 A1* 10/2020 Chen .................. G06F 1/1662

FOREIGN PATENT DOCUMENTS

JP  2021111100 A  8/2021

* cited by examiner

*Primary Examiner* — Keith G. Delahoussaye
(74) *Attorney, Agent, or Firm* — SHIMOKAJI IP

(57) ABSTRACT

A keyboard unit includes: keytops; a baseplate supporting the keytops; a light-emitting module having a light guide plate, a first reflective sheet covering a top surface of the light guide plate, and a second reflective sheet covering a bottom surface of the light guide plate, the light-emitting module being stacked on a bottom surface of the baseplate; and a hole penetrating the light-emitting module vertically. The light-emitting module includes: at a periphery of the hole, a light-shielding portion where the first and second reflective sheets are in contact with each other, the light-shielding portion covering an edge of the light guide plate; and an adhesive portion located closer to the hole than the light-shielding portion, and at the adhesive portion, the second reflective sheet covering an edge of the first reflective sheet and the second reflective sheet adhering to a bottom surface of the baseplate.

8 Claims, 6 Drawing Sheets

KEYBOARD UNIT AND ELECTRONIC APPARATUS INCLUDING COUPLER AND SUPPORT MEMBER

BACKGROUND OF THE INVENTION

Field of the Invention

The present invention relates to a keyboard unit and an electronic apparatus including a keyboard unit.

Description of the Related Art

Electronic apparatuses such as laptop PCs may have a keyboard unit including a light-emitting module that emits light from the keytops (see JP 6868716, for example).

SUMMARY OF THE INVENTION

As described in JP 6868716, the keyboard unit typically has a plurality of through holes, and is fixed to the chassis of the electronic apparatus through these through holes. These through holes are also formed in the light-emitting module, so that the conventional keyboard unit requires a structure for preventing light leakage from the holes of the light-emitting module. Such a problem of light leakage may occur similarly when holes for other purposes are formed in the light-emitting module.

In view of the problems of the conventional techniques, the present invention aims to provide a keyboard unit and an electronic apparatus including a keyboard unit capable of suppressing light leakage.

A keyboard unit according to the first aspect of the present invention includes: a plurality of keytops; a baseplate supporting the plurality of keytops; a light-emitting module having a light guide plate, a first reflective sheet covering a top surface of the light guide plate, and a second reflective sheet covering a bottom surface of the light guide plate, the light-emitting module being stacked on a bottom surface of the baseplate; and a hole penetrating the light-emitting module vertically. The light-emitting module includes: at a periphery of the hole, a light-shielding portion where the first reflective sheet and the second reflective sheet are in contact with each other, the light-shielding portion covering an edge of the light guide plate; and an adhesive portion located closer to the hole than the light-shielding portion, and at the adhesive portion, the second reflective sheet covering an edge of the first reflective sheet and the second reflective sheet adhering to a bottom surface of the baseplate.

An electronic apparatus according to the second aspect of the present invention includes: a chassis; and a keyboard unit including: a plurality of keytops; a baseplate supporting the plurality of keytops; and a light-emitting module stacked on a bottom surface of the baseplate; the keyboard unit facing a top surface of the chassis. The light-emitting module includes: a light guide plate; a first reflective sheet covering a top surface of the light guide plate; a second reflective sheet covering a bottom surface of the light guide plate; and a hole penetrating the light-emitting module vertically. The light-emitting module includes: at a periphery of the hole, a light-shielding portion where the first reflective sheet and the second reflective sheet are in contact with each other, the light-shielding portion covering an edge of the light guide plate; and an adhesive portion located closer to the hole than the light-shielding portion, and at the adhesive portion, the second reflective sheet covering an edge of the first reflective sheet and the second reflective sheet adhering to a bottom surface of the baseplate.

The above-described aspects of the present invention suppress light leakage.

DETAILED DESCRIPTION OF THE INVENTION

Figure 1:
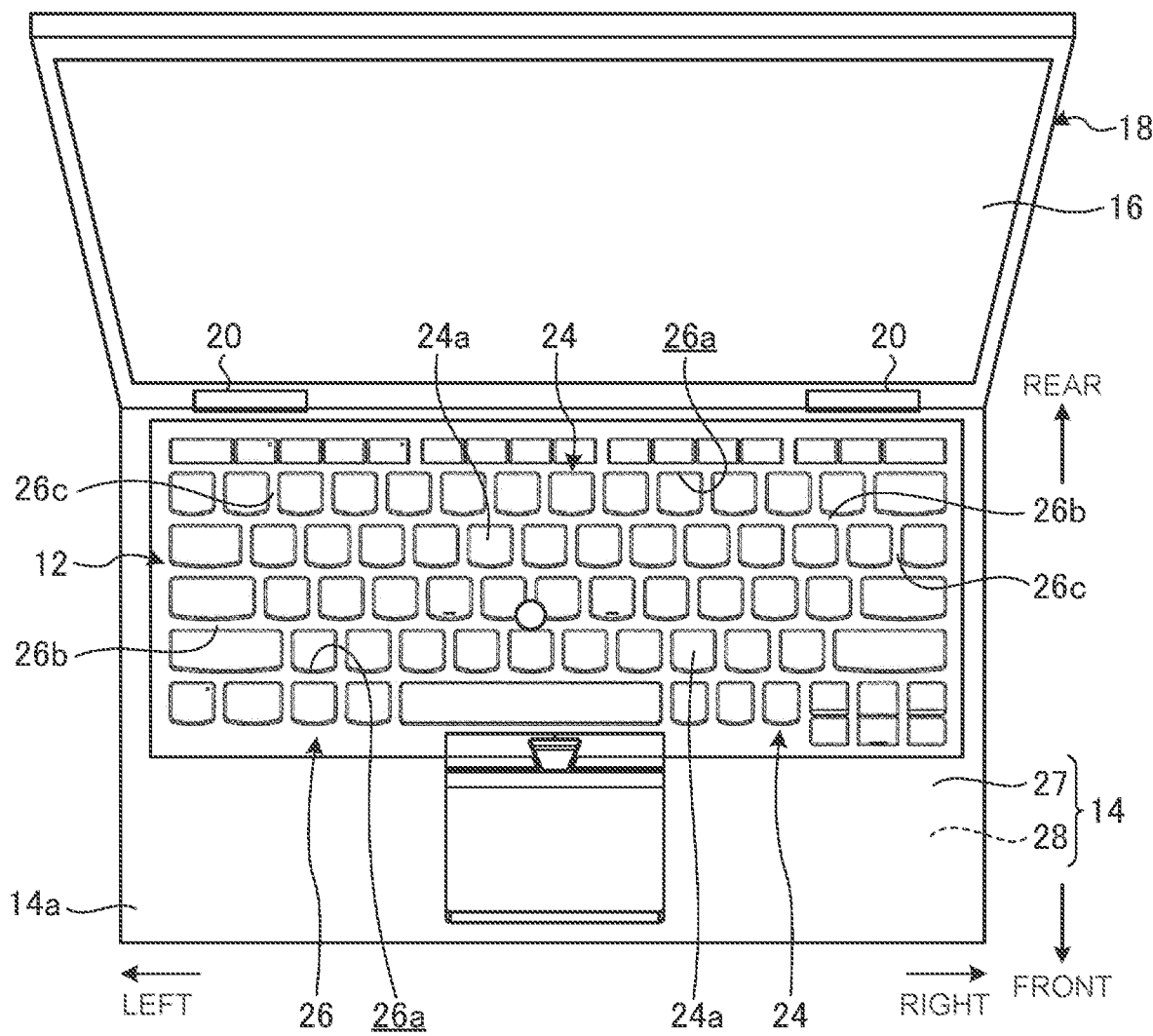
FIG. 1 is a plan view of an electronic apparatus according to one embodiment.

Referring to the drawings, the following describes a keyboard unit and an electronic apparatus including the same according to the present invention in details by way of a preferable embodiment.

FIG. 1 is a plan view of an electronic apparatus 10 according to one embodiment.

As illustrated in FIG. 1, the electronic apparatus 10 includes a chassis 14 with a keyboard unit 12 mounted thereon, and a display chassis 18 with a display 16 mounted thereon. This embodiment describes one example of the electronic apparatus 10 that is a clamshell-type laptop PC including the chassis 14 and the display chassis 18, which are relatively rotatably connected with a hinge 20. FIG. 1 illustrates the electronic apparatus with the display chassis 18 opening from the chassis 14 for use. The electronic apparatus 10 is not limited to the clamshell type as long as it is an electronic apparatus equipped with a keyboard unit.

The following describes the chassis 14 and elements mounted on the chassis 14, including the keyboard unit 12, with reference to the direction viewed from the user using the keyboard unit 12 while viewing the display 16, where a part closer to the user is front, a part away from the user is rear, the thickness of the chassis is top and bottom, and the width is left and right.

The display chassis 18 is a flat box thinner than the chassis 14, and has the display 16 on the front face. For instance, the display 16 includes organic EL or liquid crystal. The display chassis 18 is connected to the rear end of the chassis 14 at the lower end via the hinge 20.

The chassis 14 is a thin, flat box with the keyboard unit 12 facing its top surface 14a. The chassis 14 internally stores a motherboard 22 with a CPU, a memory and others mounted thereon (see FIG. 6), and various types of components C such as a speaker device, a cooling device, and a battery device.

The keyboard unit 12 is supported at the top of the chassis 14. The keyboard unit 12 has a plurality of key switches 24. The keyboard unit 12 is of an isolation type with a frame 26 segmenting the area around the keytops 24a, each of which defines the operating surface of the corresponding key switch 24.

The frame 26 is a netlike frame made of resin, metal, or other materials. The chassis 14 of the present embodiment includes a cover member 27 that defines the top surface 14a and four surrounding side faces and a cover member 28 that closes the lower opening of the cover member 27. The frame 26 is integrally molded with the cover member 27, which defines the top surface 14a. The frame 26 may be separate from the cover member 27. The frame 26 has a plurality of key holes 26a, into each of which the corresponding keytop 24a is inserted to be movable vertically. In the frame 26, the keyholes 26a are surrounded by a horizontal frame section 26b extending in the left-right direction and a vertical frame section 26c extending in the front-rear direction.

Figure 2:
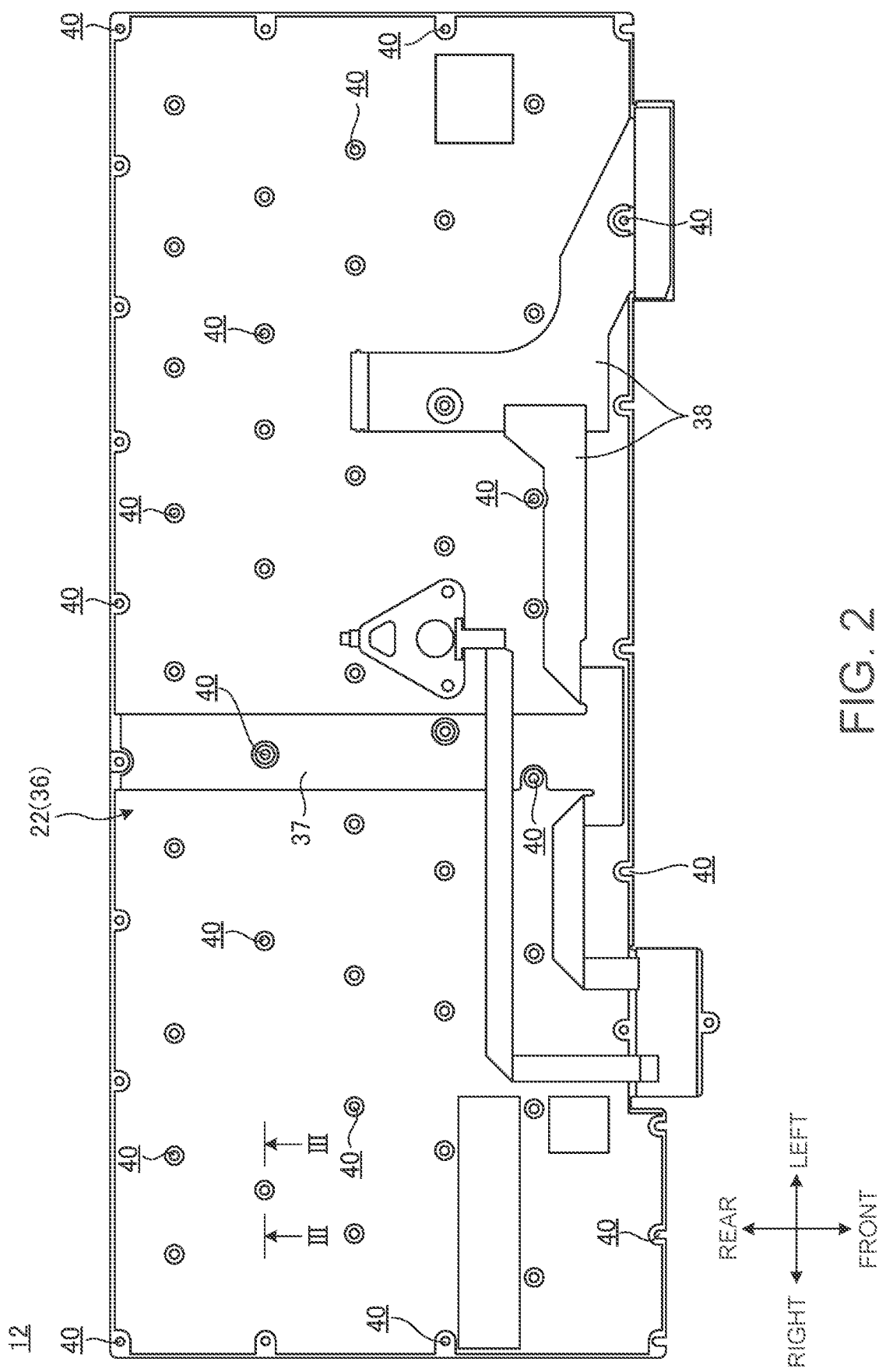
FIG. 2 is a bottom view of the keyboard unit.
Figure 3:
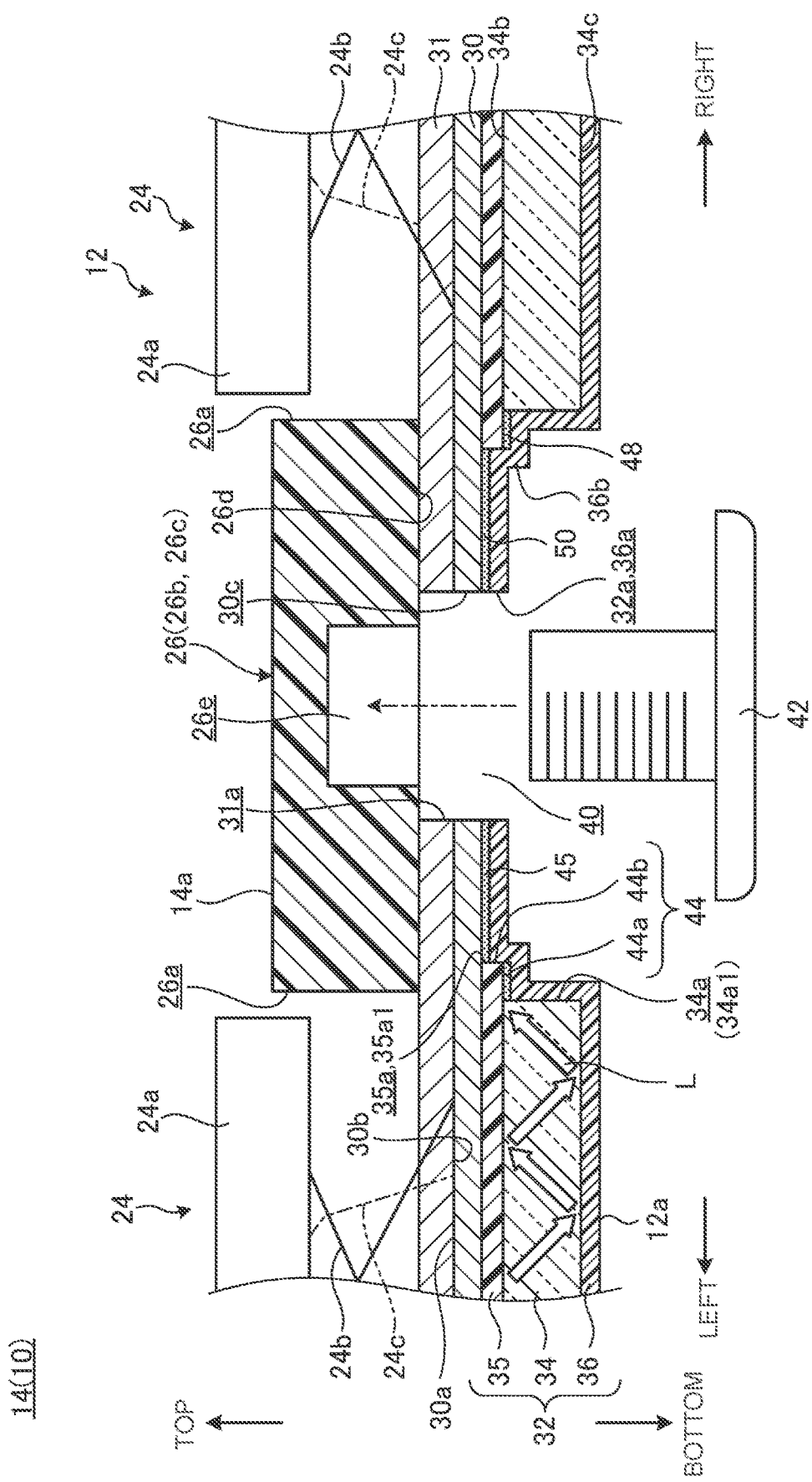
FIG. 3 is a schematic cross-sectional view along the line III-III in FIG. 2.

FIG. 2 is a bottom view of the keyboard unit 12. FIG. 3 is a schematic cross-sectional view along the line III-III in FIG. 2.

As illustrated in FIGS. 2 and 3, the keyboard unit 12 includes the plurality of key switches 24, a baseplate 30, a membrane sheet 31, and a light-emitting module 32. A sheet member made of Mylar or polyethylene terephthalate (PET) may be stacked on the bottom surface of the light-emitting module 32.

Each key switch 24 has a keytop 24a, a guide mechanism 24b, and a rubber dome 24c. The guide mechanism 24b is a scissor mechanism that supports the keytop 24a above the top surface 30a of the baseplate 30 to be movable vertically. The rubber dome 24c is made of an elastic material having flexibility such as silicone rubber, and has a dome shape. The rubber dome 24c is an elastic member to press the membrane sheet 31 when the keycap 24a is pressed down, and to return the keycap 24a to the original position when the pressing force of the keycap 24a is released.

The baseplate 30 is to attach the key switches 24 and the frame 26. The baseplate 30 is a metal plate member, such as a stainless steel plate or an aluminum plate, to which cutting and raising or punching is performed.

The membrane sheet 31 is stacked on the top surface 30a of the baseplate 30. For instance, the membrane sheet 31 is a three-layered switch sheet configured to close a contact when the membrane sheet is pressed. The membrane sheet 31 includes a fixed contact and a movable contact at an overlapped position. When the membrane sheet 31 is pressed at this overlapped position so that the movable contact comes in close contact with the fixed contact, these contacts are closed. The membrane sheet 31 has through holes at appropriate positions, and the guide mechanism 24b and the frame 26 are supported above the top surface 30a of the baseplate 30 via these through holes.

The light-emitting module 32 is a backlight module to emit light from each keytop 24a. The light-emitting module 32 is stacked on the bottom surface 30b of the baseplate 30. The light-emitting module 32 has a light guide plate 34, a first reflective sheet 35 stacked on the top surface 34b of the light guide plate 34, and a second reflective sheet 36 stacked on the bottom surface 34c of the light guide plate 34.

The light guide plate 34 is a plate or sheet of translucent resin, such as PET, polycarbonate, or acrylic. A light source unit 37 is attached to the light guide plate 34 (see FIG. 2). For instance, the light source unit 37 is attached to the center portion of the light guide plate 34 in the left-right direction, and includes a plurality of light sources, such as LED elements, that are aligned in the front-rear direction. For instance, the light source unit 37 is connected to the motherboard 22 with a flexible board 38. The light guide plate 34 directs the light emitted from the light source unit 37 in the left-right direction and illuminates the keytops 24a from the back surface.

The reflective sheets 35 and 36 cover the outer surface of the light guide plate 34 to suppress the leakage of light diffused in the light guide plate 34 to the outside, thereby enhancing the light guide efficiency. The reflective sheets 35, 36 may be made of resin with high reflective performance, such as polyethylene terephthalate (PET), polyester, or polyolefin, and may have a multi-layer structure. The reflective sheets 35, 36 are formed extremely thin (e.g., about 0.03 mm), and have flexibility. The reflective sheets 35 and 36 cover the outer surface of the light guide plate 34, excluding the area for irradiating the keytops 24a with light and the area for receiving the light from the light source section 37.

As illustrated in FIGS. 2 and 3, the keyboard unit 12 has a plurality of through holes 40. A screw 42 for fixing the keyboard unit 12 to the frame 26 is inserted through each through hole 40. The frame 26 has a threaded hole 26e on the bottom surface 26d, and a screw, which passes through the corresponding through hole 40 from the bottom to the top of the keyboard unit 12, is threadably mounted on the through hole 26e. The keyboard unit 12 is fastened to the bottom surface 26d of the frame 26 with the screws 42 passing through the through holes 40 and threadably mounted on the threaded holes 26e.

The connection structure between the keyboard unit 12 and the frame 26 may be other than the configuration with the screws 42. For instance, instead of the screws 42, a hook-shaped engagement piece protruding from the frame 26 may be used for the connection. This engagement piece may be inserted through the through hole 40 from the top to the bottom, so as to engage its claw at the tip with the bottom surface 12a of the keyboard unit 12.

As illustrated in FIG. 3, each through hole 40 includes a hole 31a, a hole 30c, and a hole 32a in this order from the top to the bottom of the keyboard unit 12, where the hole 31a is formed in the membrane sheet 31, the hole 30c is formed in the baseplate 30, and the hole 32a is formed in the light-emitting module 32. These holes 31a, 30c, and 32a are placed coaxially and communicate with each other, thus forming the through hole 40.

Next the following describes the specific configuration example of the hole 32a in the light-emitting module 32 and its surrounding.

As illustrated in FIG. 3, the hole 32a penetrates the light-emitting module 32 in the vertical direction. Therefore, the surrounding of the hole 32a requires a structure to prevent the light from the light guide plate 34 from leaking to the hole 32a. Specifically, if light leaking into the hole 32a leaks to the top and bottom surfaces of the keyboard unit 12, light will unintendedly emit from the key hole 26a, the opening for connector installation, or the intake and exhaust ports on the outer surface of the chassis 14, thus degrading the user experience (UX).

Thus, the keyboard unit 12 of this embodiment is configured so that the light-emitting module 32 includes a light-shielding portion 44 and an adhesive portion 45 at the periphery of the hole 32a. Note here that periphery of the hole 32a can also be rephrased as a substantially ring-shaped area surrounding the hole 32a in plan view. The periphery of the hole 32a can also be rephrased as the area with the light leakage prevention structure including the light-shielding portion 44 and adhesive portion 45.

The light-emitting module 32 has the holes 32a penetrating therethrough, meaning that the first reflective sheet 35, the light guide plate 34, and the second reflective sheet 36 stacked also have the holes 35a, 34a, and 36a, respectively. In this embodiment, these holes 34a, 35a, and 36a are configured so that the hole 34a of the light guide plate 34 has the largest inner diameter, the hole 36a of the second reflective sheet 36 has the smallest inner diameter, and the hole 35a of the first reflective sheet 35 has an inner diameter between the two. Thus, the hole 32a is substantially formed by the hole 36a of the second reflective sheet 36.

As illustrated in FIG. 3, the light-shielding portion 44 has an inter-sheet adhesive section 44a and a non-adhesive section 44b.

The inter-sheet adhesive section 44a is located closer to the hole 32a than the edge 34a1 of the hole 34a of the light guide plate 34, and is the portion where the reflective sheets 35, 36 are bonded to each other with adhesive 48. In this inter-sheet adhesive section 44a, the two reflective sheets 35, 36, which are bonded together, cover and seal the edge 34a1 of the light guide plate 34.

The non-adhesive section 44b is located between the inter-sheet adhesive section 44a and the adhesive portion 45, and has no adhesive between the reflective sheets 35, 36 that are in contact with each other. The second reflective sheet 36 has a bend 36b that is bent stepwise between the inter-sheet adhesive section 44a and the adhesive portion 45. At the bend 36b, the second reflective sheet 36 is cranked along the edge 35a1 of the hole 35a of the first reflective sheet 35. The non-adhesive section 44b is located at this bend 36b.

As illustrated in FIG. 3, the adhesive portion 45 is located closer to the hole 32a than the light-shielding portion 44, and faces the hole 32a in this embodiment. The adhesive portion 45 is the portion where the second reflective sheet 36 adheres to the bottom surface 30b of the baseplate with adhesive 50 while covering the edge 35a1 of the first reflective sheet 35. In this way, the light-emitting module 32 is configured so that the adhesive portion 45, the non-adhesive section 44b, and the inter-sheet adhesive section 44a are placed in this order radially outward from the center of the hole 32a.

Note here that it is difficult to use a material that completely blocks light as the adhesives 48 and 50 bonding the reflective sheets 35 and 36 due to their properties. That is, the adhesives 48 and 50 are made of a semi-transparent material, for example, and allow light to pass therethrough, which may cause light leakage.

In this regard, the keyboard unit 12 of the present embodiment includes the reflective sheets 35 and 36 that are in close contact with each other to have an ear-like shape so as to cover the edge 34a1 of the light guide plate 34, and has the light-shielding portion 44 where the inter-sheet adhesive section 44a and the non-adhesive section 44b are placed side by side. The keyboard unit 12 also has the adhesive portion 45 adjacent to the non-adhesive section 44b of the light-shielding portion 44, where the second reflective sheet 36 extends beyond the edge 35a1 of the first reflective sheet 35 to adhere to the bottom surface 30b of the baseplate 30.

Thus, at the periphery of the hole 32a, light L guided through the light guide plate 34 in this keyboard unit 12 passes through the inter-sheet adhesive section 44a adjacent to the edge 34a1 of the light guide plate 34 as indicated by the white arrows L in FIG. 3, and this light L is shielded by the non-adhesive section 44b. With this configuration, the keyboard unit 12 prevents the light L from reaching the adhesive 50 of the adhesive portion 45 and passing through it to cause light leakage to the hole 32a. As a result, the keyboard unit 12 does not require a separate light-shielding sheet on the bottom surface 12a, so that the keyboard unit alone prevents light leakage, resulting in low cost and high manufacturing efficiency. Furthermore, the keyboard unit 12 also suppresses light leakage to the hole 32a, meaning that it suppresses light leakage not only to the bottom surface 12a but also to the top surface. The electronic apparatus 10 including such a keyboard unit 12 suppresses light leakage to the top and bottom surfaces of the keyboard unit 12, and thus suppresses light leakage from the top, bottom and side surfaces of the chassis 14 to the outside.

The following describes a keyboard unit 52 that is a comparative example to explain the effectiveness of the light leakage prevention structure of the keyboard unit 12 of the present embodiment.

Figure 4:
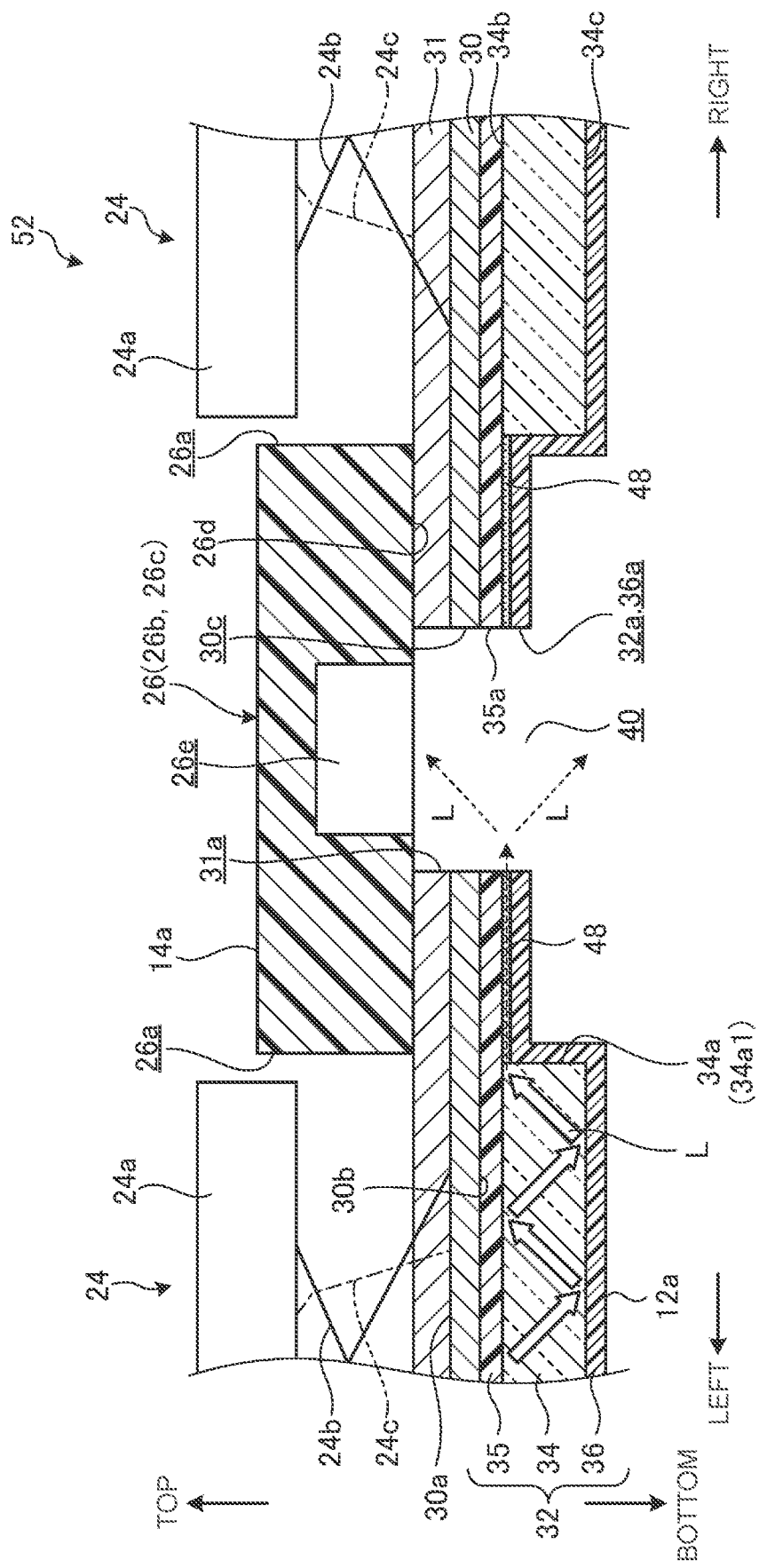
FIG. 4 is a side cross-sectional view of a keyboard unit according to a comparative example.

FIG. 4 is a side cross-sectional view of the keyboard unit 52 according to a comparative example. In FIG. 4, like reference numerals indicate like parts having the same or similar configurations in FIGS. 1 through 3, and thus the same functions and advantageous effects, and their detailed description are omitted. The same applies to FIGS. 5 and 6 described later.

The keyboard unit 52 illustrated in FIG. 4 is similar to the keyboard unit 12 of FIG. 3 in that the reflective sheets 35 and 36 bonded together with adhesive 48 to have an ear-like shape cover the edge 34a1 of the light guide plate 34.

However, the keyboard unit 52 of FIG. 4 does not include the light-shielding portion 44 (non-adhesive section 44b) and the adhesive portion 45, and the adhesive 48 faces the edge 34a1 of the light guide plate 34 and the hole 32a. Therefore, the adhesive 48 placed between the light guide plate 34 and the hole 32a in this keyboard unit 52 may lead light L from the light guide plate 34 to the hole 32a, so that the adhesive 48 may be a path for light leakage. The white arrows L in FIG. 4 indicate the light guided through the light guide plate 34, and the dashed arrows L indicate the light passed through the adhesive 48.

In this way, some of the conventional keyboard units are configured to cover the edge 34a1 of the light guide plate 34 with the bonded reflective sheets 35 and 36 to prevent light leakage, as in the keyboard unit 52 according to the comparative example. The inventors of the present invention focused on the light leakage also from the adhesive 48 as described above, and devised the configuration with the light-shielding portion 44 and the adhesive portion 45 of FIG. 3 so as to suppress the light leakage more reliably. That is, the inventors determined that, to prevent light leakage from the adhesive 48 adjacent to the light guide plate 34 in the light-emitting module 32, where the top and bottom surfaces of the light guide plate 34 are covered with extremely thin reflective sheets 35 and 36, the most favorable structure is the light shielding structure that brings the reflective sheets 35 and 36 in contact with each other without adhesive therebetween.

In the keyboard unit 12 of the present embodiment, the light-shielding portion 44 may not have the inter-sheet adhesive section 44a. That is, the reflective sheets 35 and 36 are fixed to the outer surface of the light guide plate 34 with adhesive applied locally as appropriate. To prevent the second reflective sheet 36 from falling from the edge 34a1 of the light guide plate 34, fixing with the inter-sheet adhesive section 44a is effective. However, as illustrated in FIG. 3, the second reflective sheet 36 is fixed to the baseplate 30 with the adhesive portion 45 at the edge facing the hole 32a (36a). This means that the second reflective sheet 36 is less likely to fall from the edge 34a1 of the light guide plate 34. Therefore, the inter-sheet adhesive section 44a (adhesive 48) may be omitted from the light-shielding portion 44.

In the keyboard unit 12 of the present embodiment, the second reflective sheet 36 has a stepwise bend 36b between the inter-sheet adhesive section 44a and the adhesive portion 45, and the non-adhesive section 44b is placed at this bend 36b. In this way, the keyboard unit 12 has a step formed as the bend 36b between the inter-sheet adhesive section 44a and the adhesive portion 45, through which the light L may be transmitted. With this configuration, the keyboard unit 12 more reliably shields the light L transmitted through the adhesive 48 by the non-adhesive portion 44b at the bend 36b, and more reliably suppress the entering of the light L into the adhesive 50.

These light-shielding portion 44 and adhesive portion 45 for preventing light leakage at the hole 32a of the light-emitting module 32 can be used at places other than the through holes 40 for fixing the keyboard unit 12 to the frame 26. Next, the following describes other application examples of the light leakage prevention structure with the light-shielding portion 44 and adhesive portion 45.

Figure 5:
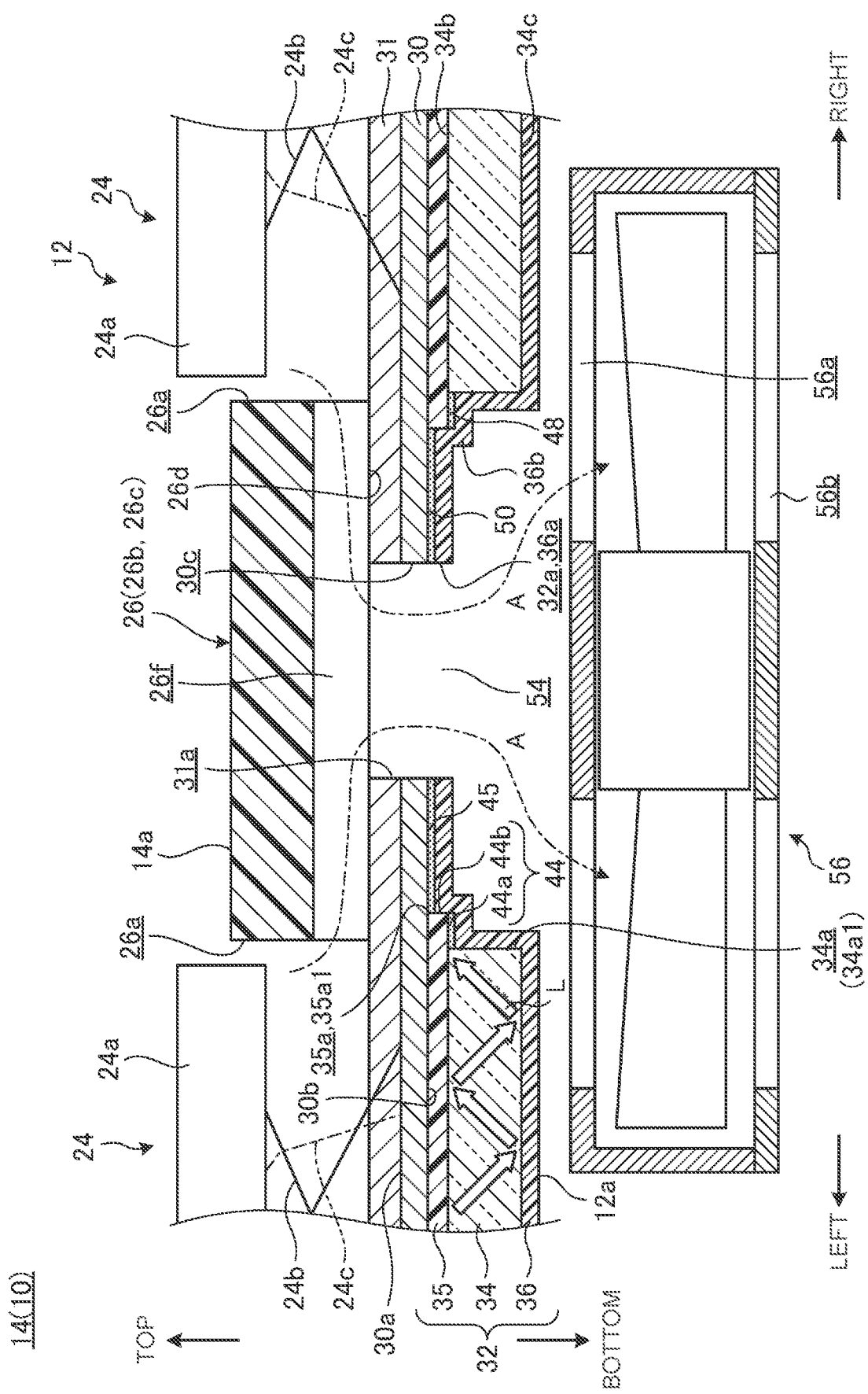
FIG. 5 is a side cross-sectional view of the chassis, illustrating a configuration in which the light leakage prevention structure with the light-shielding portion and adhesive portion is applied to a through hole that serves as the air intake of the keyboard unit.

FIG. 5 is a side cross-sectional view of the chassis 14, illustrating a configuration in which the light leakage prevention structure with the light-shielding portion 44 and adhesive portion 45 is applied to a through hole 54 that serves as the air intake of the keyboard unit 12.

As illustrated in FIG. 5, the through hole 54, like the through hole 40, penetrates the keyboard unit 12 in the vertical direction, and thus requires the hole 32a of the light-emitting module 32. The through hole 54 is an air intake, where a fan 56 installed inside the chassis 14 draws in outside air A from the above the keyboard unit 12. For instance, the fan 56 is a centrifugal fan having apertures 56a and 56b for air intake on its top and bottom surfaces and drawing air through these apertures 56a and 56b by rotation of the impeller. The aperture 56a on the top surface sucks outside air through the through hole 54. The aperture 56b on the bottom surface sucks outside air through a slit formed on the bottom surface of the chassis 14. The frame 26 has a recess 26f for communicating the through hole 54 with the upper portion of the keyboard unit 12.

Also in the configuration with such a through hole 54, the light-shielding portion 44 and adhesive portion 45 suppress light leakage into the hole 32a formed in the light-emitting module 32.

Figure 6:
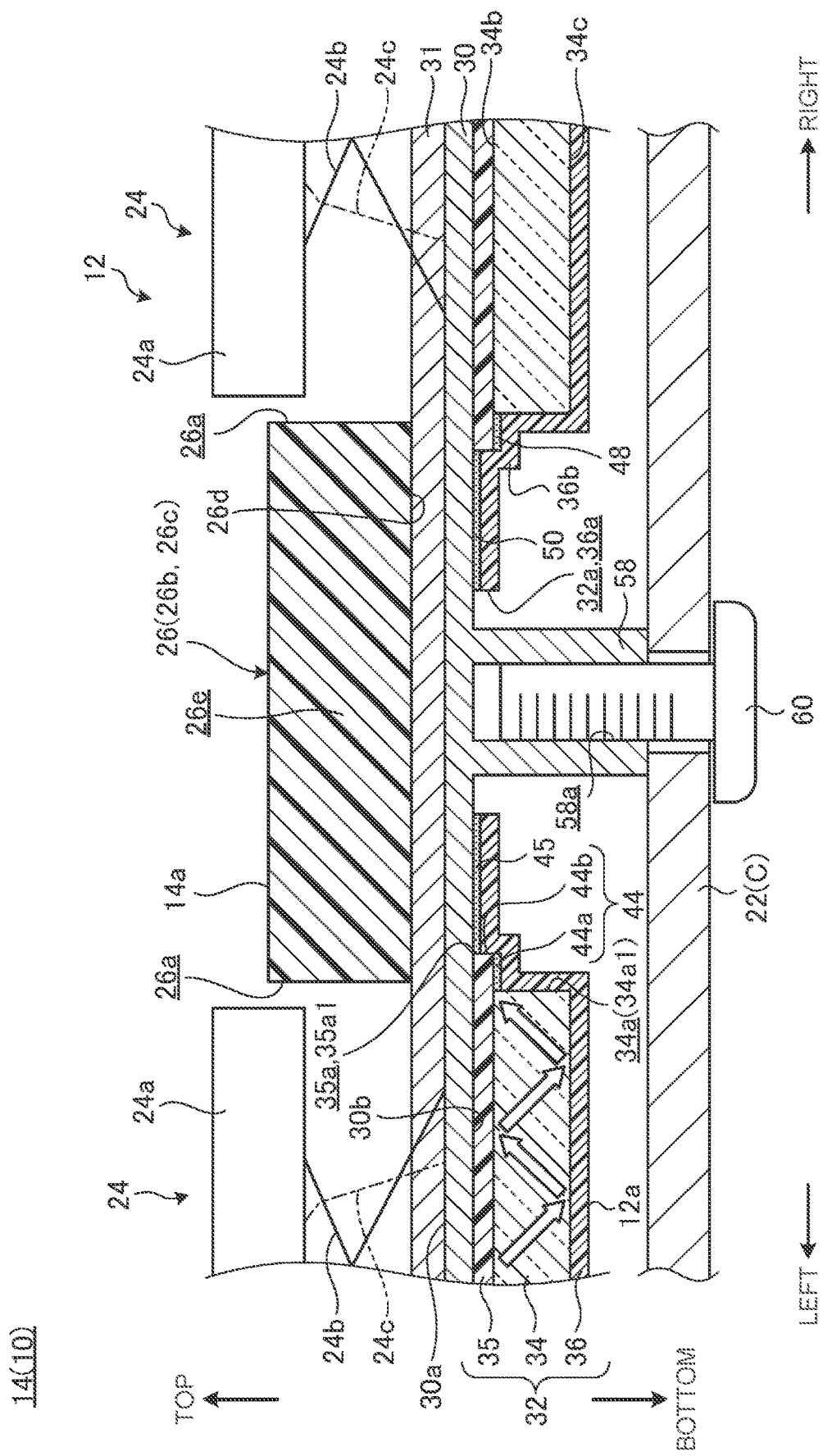
FIG. 6 is a side cross-sectional view of the chassis, illustrating a configuration in which the light leakage prevention structure with the light-shielding portion and adhesive portion is applied to a hole, into which a support member supporting a component is inserted.

FIG. 6 is a side cross-sectional view of the chassis 14, illustrating a configuration in which the light leakage prevention structure with the light-shielding portion 44 and adhesive portion 45 is applied to a hole 32a, into which a support member 58 supporting a component C is inserted.

As illustrated in FIG. 6, the support member 58 is a metal stud protruding downward from the bottom surface 30b of the baseplate 30. The support member 58 has a downward threaded hole 58a. The support member 58 is required to support a component C such as the motherboard 22 below the light-emitting module 32. Therefore, the light-emitting module 32 requires the hole 32a for inserting the support member 58 therethrough. The support member 58 is inserted through the hole 32a, and can be connected to the component C at the tip with a screw 60.

The light leakage prevention structure with the light-shielding portion 44 and adhesive portion 45 is applicable also to such a hole 32a for inserting the support member 58 therethrough. In this way, the light leakage prevention structure with light-shielding portion 44 and adhesive portion 45 may be applied to a structure other than the through holes 40 and 54 penetrating the keyboard unit 12, that is, any configuration with the hole 32a formed in the light-emitting module 32.

The present invention is not limited to the above-described embodiments, and can be modified freely without deviating from the scope of the present invention.

The invention claimed is:

1. A keyboard unit comprising:
   a plurality of keytops;
   a baseplate supporting the plurality of keytops;
   a light-emitting module having a light guide plate, a first reflective sheet covering a top surface of the light guide plate, and a second reflective sheet covering a bottom surface of the light guide plate, wherein the light-emitting module is on a bottom surface of the baseplate; and
   a hole in the light-emitting module,
   the light-emitting module having at a periphery of the hole,
      a light-shielding portion where the first reflective sheet and the second reflective sheet are in contact with each other, the light-shielding portion covering an edge of the light guide plate; and
      an adhesive portion located closer to the hole than the light-shielding portion, and at the adhesive portion, the second reflective sheet covers an edge of the first reflective sheet and the second reflective sheet adheres to the bottom surface of the baseplate.

2. The keyboard unit according to claim 1, wherein the light-shielding portion includes:
   an inter-sheet adhesive section adjacent to an edge of the light guide plate, wherein the first reflective sheet and the second reflective sheet are bonded to each other; and
   a non-adhesive section between the inter-sheet adhesive section and the adhesive portion, the non-adhesive section having no adhesive between the first and second reflective sheets.

3. The keyboard unit according to claim 2, wherein the second reflective sheet has a stepwise bend between the inter-sheet adhesive section and the adhesive portion, and
the non-adhesive section is at the bend.

4. An electronic apparatus comprising:
   a chassis; and
   a keyboard unit including a plurality of keytops; a baseplate supporting the plurality of keytops; and a light-emitting module stacked on a bottom surface of the baseplate; wherein the keyboard unit faces a top surface of the chassis,
   the light-emitting module including:
      a light guide plate;
      a first reflective sheet covering a top surface of the light guide plate;
      a second reflective sheet covering a bottom surface of the light guide plate; and
      a hole in the light-emitting module,
   the light-emitting module having at a periphery of the hole,
      a light-shielding portion where the first reflective sheet and the second reflective sheet are in contact with each other, wherein the light-shielding portion covers an edge of the light guide plate; and
      an adhesive portion located closer to the hole than the light-shielding portion, and at the adhesive portion, the second reflective sheet covers an edge of the first reflective sheet and the second reflective sheet adheres to the bottom surface of the baseplate.

5. The electronic apparatus according to claim 4, wherein the light-shielding portion includes:

an inter-sheet adhesive section adjacent to the edge of the light guide plate, wherein the first reflective sheet and the second reflective sheet are bonded to each other; and a non-adhesive section between the inter-sheet adhesive section and the adhesive portion, wherein the non-adhesive section has no adhesive between the first and second reflective sheets.

6. The electronic apparatus according to claim 4, further comprising:

a frame between the plurality of keytops, wherein the keyboard unit has a plurality of vertical through holes, and the through holes are each part of the hole.

7. The electronic apparatus according to claim 6, wherein in one of the through holes, a coupler that couples the keyboard unit to the frame is therein.

8. The electronic apparatus according to claim 4, further comprising:

a component below the keyboard unit, wherein a support member supporting the component is in the hole.

* * * * *